Figure 1:
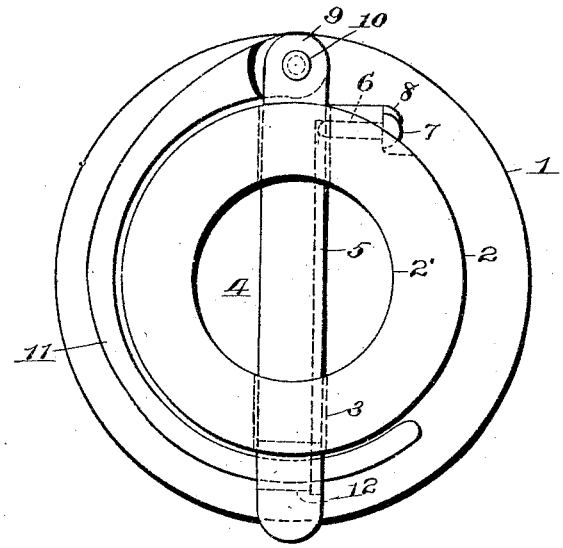

F. J. TRUMPOUR.
LOCK WASHER.
APPLICATION FILED JUNE 25, 1919.

1,368,201.

Patented Feb. 8, 1921.

Inventor
Frederick J. Trumpour

UNITED STATES PATENT OFFICE.

FREDERICK J. TRUMPOUR, OF WASHINGTON, DISTRICT OF COLUMBIA.

LOCK-WASHER.

1,368,201.          Specification of Letters Patent.          Patented Feb. 8, 1921.

Application filed June 25, 1919. Serial No. 306,752.

(FILED UNDER THE ACT OF MARCH 3, 1883, 22 STAT. L., 625.)

*To all whom it may concern:*

Be it known that I, FREDERICK J. TRUMPOUR, a citizen of the United States, and a resident of Washington, District of Columbia, have invented an Improvement in Lock-Washers, of which the following is a specification.

The invention described herein may be used by the Government, or any of its officers or employees in prosecution of work for the Government, or by any other person in the United States, without payment of any royalty thereon.

My invention is an improved lock washer, that is to say, a washer adapted to be fitted upon a shaft, axle or other structure and which will have means engaging said structure for locking the washer in position and permitting the detachment of the washer when found necessary and desirable.

One object of my invention is the provision of a device of the character stated which will prove particularly desirable for use upon the shafts or axles of trucks and other vehicles, where it is necessary to have a lock washer capable of instant application or removal, and which cannot possibly become accidentally detached under the most severe wear or strain.

Another object of my invention, is the provision of a lock washer whose constituent elements are entirely carried by the washer and cannot become detached therefrom under any condition and which will permit instant operation of its parts in the functions of application to and detachment from the shaft or axle.

Another object of my invention, is the provision of a lock washer, which will be composed of few parts insuring simplicity, durability, and inexpensiveness of production and which under all conditions of service will prove highly efficient and practical.

With these objects in view the invention broadly stated consists of a washer having an opening to receive a shaft or axle, a locking key mounted in said washer and adapted to have locking engagement with said axle or shaft, and means for locking the key to properly secure the washer upon the axle or shaft as well as locking the washer in position.

The invention further consists of a lock washer embodying novel details of construction and combination of parts for service substantially as shown, described and particularly defined and distinguished by the claim.

In order that the construction in detail and the operation of my lock washer may be understood, and the advantages accruing from my improvements may be appreciated, I have illustrated in the accompanying drawing a lock washer construction embodying my invention, such illustrated construction, being capable of changes or modifications within the scope of the claim, and in said drawing:—

Figure 2:
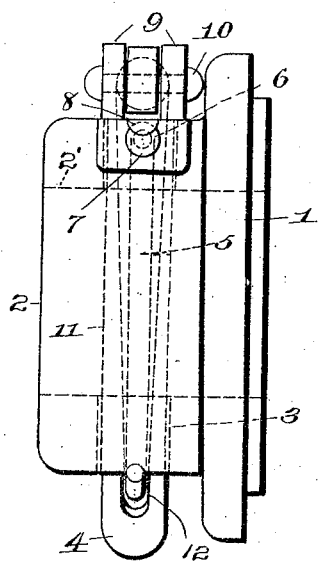

Figure 1 is a front elevation of a lock washer constructed in accordance with my invention, the parts being shown in the position they occupy when the washer is locked upon a shaft or axle; and Fig. 2 is a side view or elevation of the complete lock washer with the parts shown in locked position.

The aim of this invention is to produce a lock washer composed of the fewest possible number of parts and such device consists of the washer 1, provided with the boss or projection 2, said boss and washer having an opening 2' to receive the axle or shaft not shown, in connection with which the washer is to be used. The boss is provided with a passage 3, for the reception of the locking key, 4, retained in the boss by means of the channel, 5, engaged by the inner end of the pin, 6, whose outer head portion, 7, is confined and secured by the bent lip, 8, and to the upper bifurcated end, 9, of the locking key is pivoted, by means of the pin, 10, the curved locking spring, 11, whose free end is adapted to pass through an aperture, 12, of the locking pin and thus, as clearly shown in the drawing, lock the key in position and positively prevent accidental detachment thereof.

In applying my lock washer, the spring key-locking member is released, the key is raised to clear the opening in the washer and in this condition, the washer is placed upon the shaft or axle, and when the usual opening in the shaft or axle, not shown, is in line with the passage in the washer, the key is permitted to pass through such opening and passage of the axle and washer and seats on the boss as shown, and in this position the spring key-locking member is forced into engagement with the aperture, 12, of the key, locking the key and absolutely preventing accidental movement of said key or detachment of the washer from the axle or shaft, thus insuring a lock washer capable of quick application or detachment; which forms a positive and reliable lock upon the axle or shaft for retaining a wheel or other element upon said axle or shaft, and which lock washer embodies a cheap, efficient and entirely practical device for any purpose where such a washer would fulfill its functions.

I claim:—

A lock washer, including a washer formed with a boss and provided with a passage through the boss, a key formed for insertion in the passage, said key having a bifurcated head at one end and provided with an aperture adjacent its other end, a curved locking member pivoted in the bifurcated head and adapted to partially encircle the boss and pass through the aperture of the key to lock the key in place.

FREDERICK J. TRUMPOUR.